(12) United States Patent
Hanson et al.

(10) Patent No.: US 10,190,773 B2
(45) Date of Patent: Jan. 29, 2019

(54) ATTACHMENT STUD ON A COMBUSTOR FLOATWALL PANEL WITH INTERNAL COOLING HOLES

(71) Applicant: United Technologies Corporation, Farmington, CT (US)

(72) Inventors: Russell B. Hanson, Jupiter, FL (US); George F. Titterton, III, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 125 days.

(21) Appl. No.: 15/029,000

(22) PCT Filed: Oct. 23, 2014

(86) PCT No.: PCT/US2014/061938
§ 371 (c)(1),
(2) Date: Apr. 13, 2016

(87) PCT Pub. No.: WO2015/069466
PCT Pub. Date: May 14, 2015

(65) Prior Publication Data
US 2016/0273770 A1    Sep. 22, 2016

Related U.S. Application Data

(60) Provisional application No. 61/899,913, filed on Nov. 5, 2013.

(51) Int. Cl.
*F23R 3/06* (2006.01)
*F23R 3/00* (2006.01)
(Continued)

(52) U.S. Cl.
CPC .............. *F23R 3/002* (2013.01); *F02C 3/04* (2013.01); *F02C 7/18* (2013.01); *F23R 3/06* (2013.01);
(Continued)

(58) Field of Classification Search
CPC ........ F02C 7/18; F05D 2230/22; F23R 3/002; F23R 3/06; F23R 3/60; F23R 2900/03041; F23R 2900/03042; F23R 2900/03043
See application file for complete search history.

(56) References Cited

U.S. PATENT DOCUMENTS

| 4,422,300 A | 12/1983 | Dierberger et al. |
| 5,079,915 A | 1/1992 | Veau |

(Continued)

FOREIGN PATENT DOCUMENTS

| EP | 0972992 A2 | 7/1999 |
| EP | 2554903 A2 | 2/2013 |

OTHER PUBLICATIONS

Extended European Search Report for EP Application No. 14860205.5, dated May 22, 2017, 7 pages.
(Continued)

*Primary Examiner* — Ehud Gartenberg
*Assistant Examiner* — James McGlynn
(74) *Attorney, Agent, or Firm* — Kinney & Lange, P.A.

(57) ABSTRACT

A combustor floatwall panel includes a stack of layers of a sintered material forming in the aggregate a panel, an attachment stud, and a cooling flow passageway. The panel has a first surface and a second surface parallel to the first surface. The attachment stud projects from the second surface. The cooling flow passageway includes a feeder hole extending through the attachment stud, and at least one effusion cooling hole extending to the first surface. The (Continued)

effusion cooling hole is fluidly connected to the feeder hole. The effusion cooling hole extends along a first axis where the effusion cooling hole meets the first surface. The feeder hole extends along a second axis. The first axis is at a first angle relative to the first surface. The second axis is at a second angle relative to the first surface. The second angle is greater than the first angle.

19 Claims, 7 Drawing Sheets

(51) Int. Cl.
    *F23R 3/46*     (2006.01)
    *F23R 3/60*     (2006.01)
    *F02C 3/04*     (2006.01)
    *F02C 7/18*     (2006.01)

(52) U.S. Cl.
    CPC .................. *F23R 3/46* (2013.01); *F23R 3/60* (2013.01); *F05D 2220/32* (2013.01); *F05D 2230/10* (2013.01); *F05D 2230/22* (2013.01); *F05D 2240/35* (2013.01); *F05D 2300/175* (2013.01); *F23R 2900/03041* (2013.01); *F23R 2900/03042* (2013.01); *F23R 2900/03043* (2013.01); *Y02T 50/675* (2013.01)

(56) References Cited

U.S. PATENT DOCUMENTS

| | | | |
|---|---|---|---|
| 5,758,503 A | 6/1998 | DuBell et al. | |
| 6,718,774 B2* | 4/2004 | Razzell | F01D 25/243 60/753 |
| 6,857,275 B2* | 2/2005 | Pidcock | F23R 3/002 60/752 |
| 6,925,811 B2 | 8/2005 | Justis et al. | |
| 7,464,554 B2 | 12/2008 | Cheung et al. | |
| 8,387,397 B2* | 3/2013 | Chen | F23R 3/06 60/752 |
| 8,707,706 B2* | 4/2014 | Garry | F23R 3/002 60/752 |
| 2003/0123953 A1 | 7/2003 | Razzell | |
| 2005/0150233 A1* | 7/2005 | Glessner | F16B 5/0208 60/796 |
| 2008/0271457 A1* | 11/2008 | McMasters | F23R 3/002 60/754 |
| 2010/0011775 A1* | 1/2010 | Garry | C23C 4/02 60/752 |
| 2010/0095678 A1 | 4/2010 | Hawie et al. | |
| 2011/0016874 A1 | 1/2011 | Chandler et al. | |
| 2011/0023495 A1 | 2/2011 | Bronson et al. | |
| 2011/0030378 A1 | 2/2011 | Carlisle | |
| 2012/0117973 A1* | 5/2012 | Gerendas | F23R 3/06 60/755 |
| 2014/0216042 A1 | 8/2014 | Hanson | |
| 2016/0186997 A1* | 6/2016 | Sadil | F02C 7/24 60/772 |

OTHER PUBLICATIONS

International Search Report and Written Opinion, for PCT Application No. PCT/US2014/061938, dated Feb. 4, 2015, 9 pages.

\* cited by examiner

ATTACHMENT STUD ON A COMBUSTOR FLOATWALL PANEL WITH INTERNAL COOLING HOLES

BACKGROUND

The present invention relates to liners such as floatwall panels for use in gas turbine engine combustors, and in particular to floatwall panels with cooling holes for creating a cooling film. Combustors used in commercial gas turbine engines, such as those used in aircraft or power generation, may generate combustion gases at very high temperatures. These temperatures are often high enough to damage the combustor wall unless sufficient cooling is provided. The walls may be cooled in a variety of ways, including impingement cooling, transpiration cooling, convective cooling, or effusion cooling (also called film cooling). The present invention relates to cooling holes used in convective cooling and effusion cooling.

For effective cooling by effusion in a gas turbine engine, many effusion cooling holes are typically created through the wall of the combustion chamber. Often, the wall is made of many floatwall panels, each including effusion cooling holes. The cooling holes may be made by laser ablation or electrical discharge machining These methods of creating cooling holes have disadvantages. For example, electrical discharge machining is typically too slow and expensive to be a feasible option to manufacturers of combustor liners. Laser ablation is a faster, cheaper option, but suffers from line of sight limitations. Such limitations prevent floatwall panels from including effusion cooling holes distributed ideally across the floatwall panel surfaces. This may require overcooling in some areas to achieve the durability required for the floatwall panels. Such overcooling may result in excess consumption of compressed cooling air produced by the engine, with a detrimental effect on the thrust specific fuel consumption of the turbine engine.

SUMMARY

An embodiment of the present invention is a combustor floatwall panel including a stack of layers of a sintered material. The stack of layers forms in the aggregate a panel, an attachment stud, and a cooling flow passageway. The panel has a first surface and a second surface parallel to the first surface. The attachment stud projects from the second surface. The cooling flow passageway is made up of a series of apertures in adjacent layers. The cooling flow passageway includes a feeder hole extending through the attachment stud, and at least one effusion cooling hole extending to the first surface. The effusion cooling hole is fluidly connected to the feeder hole. The one or each effusion cooling hole extends along a first axis where the effusion cooling hole meets the first surface. The feeder hole extends along a second axis through the attachment stud. The first axis is at a first angle relative to the first surface. The second axis is at a second angle relative to the first surface. The second angle is greater than the first angle.

Another embodiment of the present invention is a method for making a combustor floatwall panel includes forming, by selectively sintering a pulverant material, a multilayer structure including a wall, an attachment stud projecting from the wall, and a series of interconnected apertures filled with unsintered pulverant material; and removing the unsintered pulverant material from the interconnected apertures to create a cooling flow passageway. The cooling flow passageway includes a feeder hole extending through the attachment stud, and at least one effusion cooling hole extending to the first surface and fluidly connected to the feeder hole. The one or each effusion cooling hole extends along a first axis where the effusion cooling hole meets the first surface. The first axis is at a first angle relative to the first surface. The feeder hole extends along a second axis through the attachment stud at a second angle relative to the first surface. The second angle is greater than the first angle.

Another embodiment of the present invention is a gas turbine engine including a compressor section, a turbine section, and a combustor section arranged between the compressor section and the turbine section. The combustor section includes a high pressure plenum in fluid communication with the compressor section, a combustion chamber in fluid communication with the turbine section, and at least one combustor floatwall panel arranged between the high pressure plenum and the combustion chamber. The combustor floatwall panel includes a cooling flow passageway. The cooling flow passageway includes a feeder hole extending through an attachment stud, and at least one effusion cooling hole extending to a first surface facing the combustion chamber. The effusion cooling hole is fluidly connected to the feeder hole. The one or each effusion cooling hole extends along a first axis where the effusion cooling hole meets the first surface. The first axis is at a first angle relative to the first surface. The feeder hole extends along a second axis through the attachment stud at a second angle relative to the first surface. The second angle is greater than the first angle.

DETAILED DESCRIPTION

Figure 1:
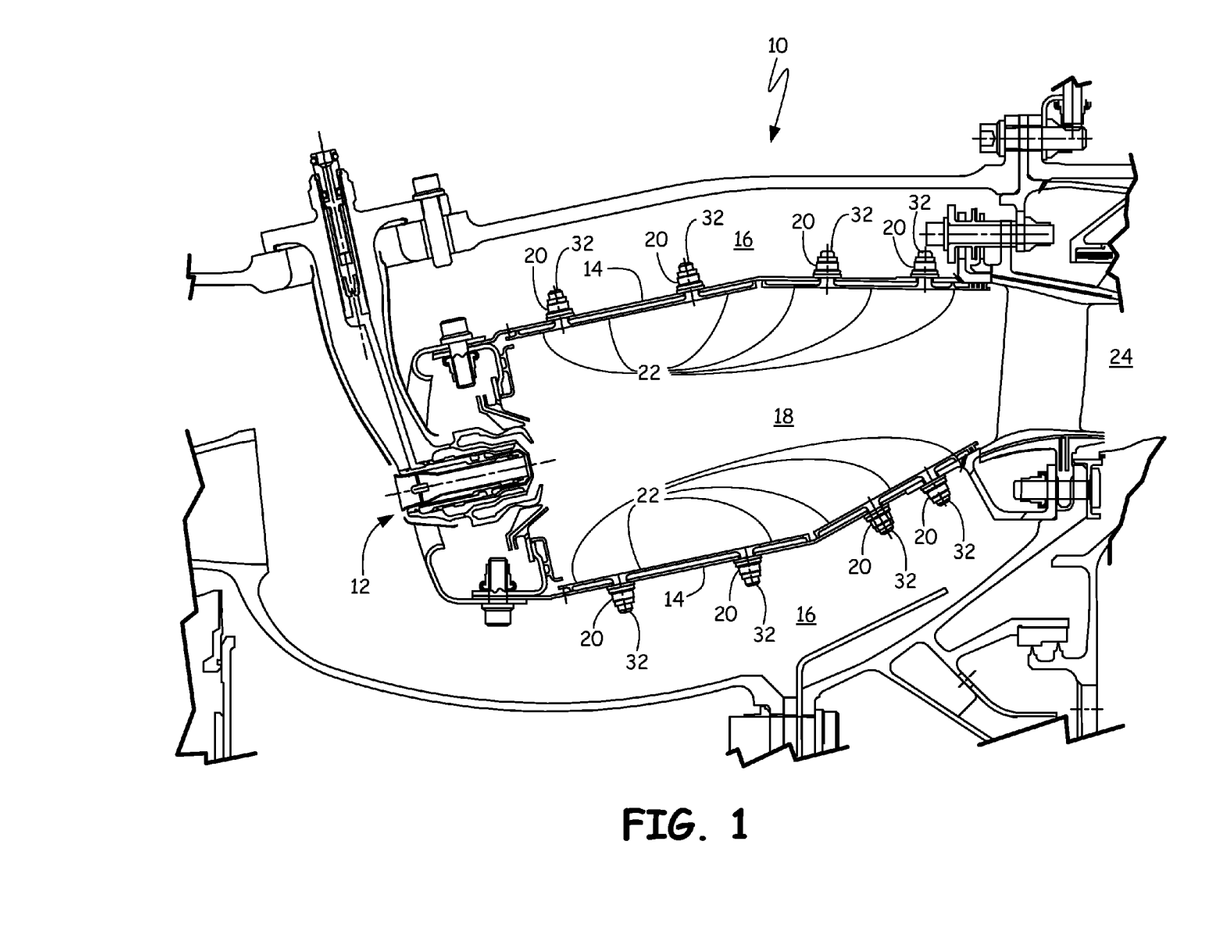
FIG. 1 is a schematic view of a commercial combustor floatwall cross section.

FIG. 1 shows combustor 10, which includes fuel injector 12, shell 14, high pressure plenum 16, combustion chamber 18, fasteners 20, and floatwall panels 22. Downstream of combustor 10 is turbine section 24.

Fuel injector 12 is arranged on the upstream end of combustor 10. Airflow travels from fuel injector 12 through combustor 10, and exits combustor 10 into turbine section 24. Pressurized air passes through shell 14 from high pressure plenum 16 and into combustion chamber 18. Air is able to pass through shell 14 either through openings such as dilution holes (not shown) or impingement cooling holes (not shown), and through floatwall panels 22 as described below. Fasteners 20 attach floatwall panels 22 to shell 14 by fastening on to attachment studs 32. Floatwall panels 22 protect shell 14 from the intense heat generated by combustion within combustion chamber 18.

Figure 2:
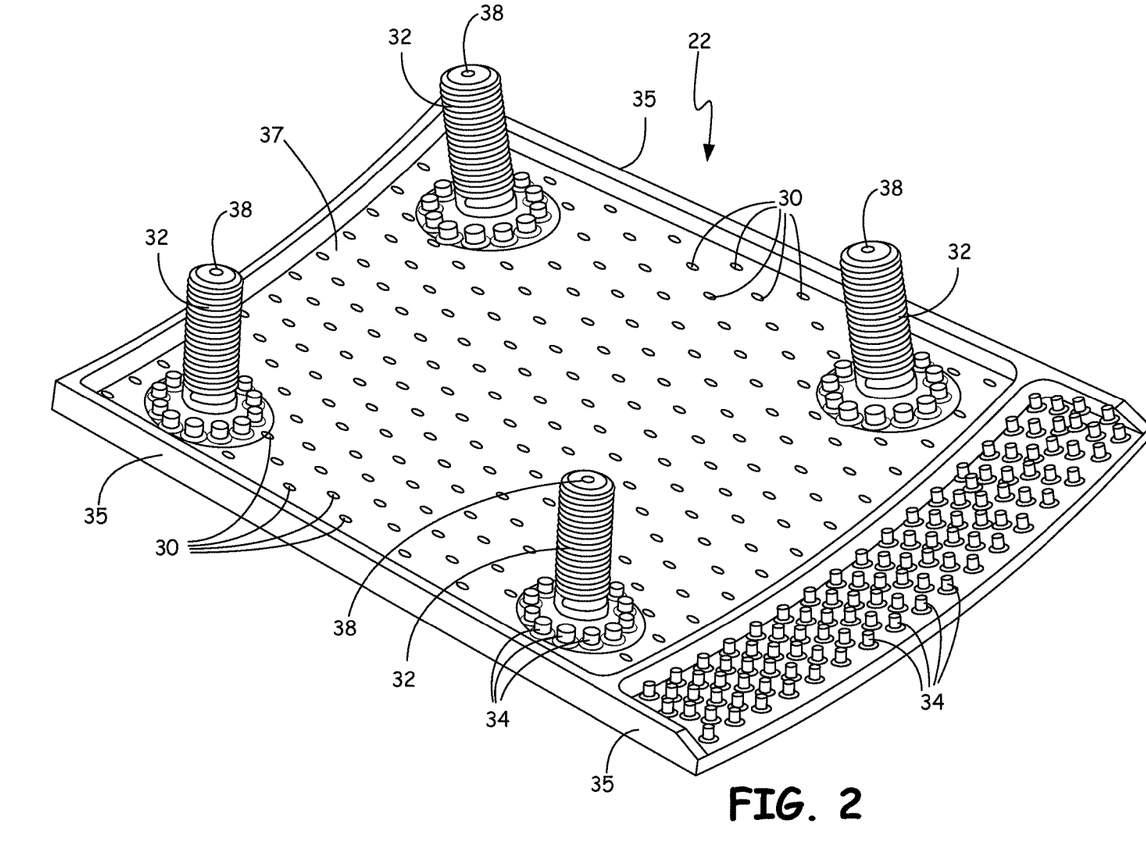
FIG. 2 is a perspective view of a combustor floatwall panel with cooling flow passageways through attachment studs.

FIG. 2 shows floatwall panel 22 in perspective view, taken from the perspective of high pressure plenum 16 (FIG. 1). Floatwall panel 22 includes a plurality of effusion cooling holes 30, attachment studs 32, pedestals 34, and rail 35. Effusion cooling holes 30 allow for effusion of air through floatwall panel 22 in order to create a cooling film protecting floatwall panel 22 from hot combustion gases. Attachment studs 32 facilitate attachment of floatwall panel 22 to other parts, such as shell 14 (FIG. 1). Pedestals 34 are used for various functions, such as impingement cooling or for spacing floatwall panel 22 from shell 14 (FIG. 1). Rail 35 likewise may be used for impingement cooling or spacing floatwall panel 22 from shell 14 (FIG. 1). Additionally, rail 35 may be used to maintain a desirable pressure differential between high pressure plenum 16 (FIG. 1) and combustion chamber 18 (FIG. 1). The features, including attachment studs 32, pedestals 34, and rails 35, may be formed integrally with floatwall panel 22.

Floatwall panel 22 is designed to pass cooling air from one side to the other to cool floatwall panel 22. Floatwall panel 22 passes air to first surface 36 (FIG. 3) from second surface 37. Effusion cooling holes 30 are arranged along floatwall panel 22, and pass through floatwall panel 22 from second surface 37 facing shell 14 to first surface 36 facing combustion chamber 18 (FIG. 1).

Floatwall panel 22 employs effusion cooling, in which effusion cooling holes 30 pass relatively cool air along first surface 36 of floatwall panel 22 facing combustion chamber 18 (FIG. 1). In effusion cooling, the air passed by effusion cooling holes 30 preferably forms a cooling film, which prevents direct convective thermal transfer between combustion gases and floatwall panel 22. Effusion cooling holes, such as effusion cooling holes 30, typically form a shallow angle with first surface 36 of floatwall panel 22 to aid in forming the cooling film.

In the disclosed embodiments, it is desirable to form an effusion film which does not include gaps where combustion gases come into contact with floatwall panel 22. Floatwall panel 22 as shown in FIG. 2 includes cooling flow passageway 38 which extends through attachment stud 32 to first surface 36 of floatwall panel 22 to eliminate gaps in the effusion film, as described below.

Figure 3:
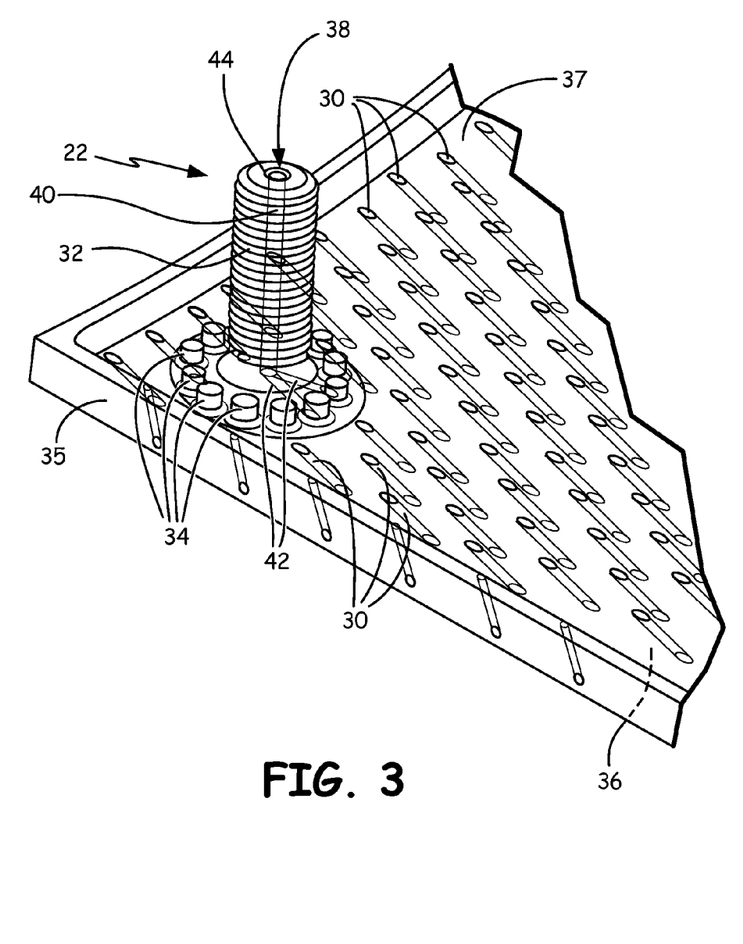
FIG. 3 is a perspective view of a portion of the combustor floatwall panel shown in FIG. 2 with a second surface facing up.

FIG. 3 is a perspective view of a portion of floatwall panel 22 of FIG. 2 with second surface 37 facing up. FIG. 3 contains the same parts as shown in FIG. 2, including floatwall panel 22, cooling holes 30, and the attachment stud 32, pedestals 34, and rail 35 features. As shown in FIG. 3, cooling flow passageway 38 includes feeder hole 40 and at least one effusion cooling hole 42 (two effusion cooling holes 42 are shown). Effusion cooling holes 30, feeder hole 40, and effusion cooling holes 42 are intended to be shown in phantom. However, they are illustrated with lighter lines rather than broken lines for clarity. Effusion cooling hole 42 extends to first surface 36, where it forms a shallow, acute angle relative to first surface 36. Feeder hole 40 extends through attachment stud 32 to fluidly connect to effusion cooling hole 42. Feeder hole 40 does not extend to first surface 36. In the embodiment of FIG. 3, feeder hole 40 is fluidly connected to effusion cooling hole 42 by a direct connection from feeder hole 40 to effusion cooling 42. Feeder hole 40 is shown with an optional chamfer 44 at an end of feeder hole 40 farthest from effusion cooling hole 42.

Considering FIGS. 1, 2, and 3 together, in operation, cooling air from high pressure plenum 16 is directed to the second surface 37 of floatwall panel 22 by way of impingement holes (not shown) in shell 14. The flow of cooling air then flows through effusion cooling holes 30 to provide film cooling at first surface 36 of floatwall panel 22. Cooling air from high pressure plenum 16 also flows into feeder hole 40 of cooling flow passageway 38. The cooling air flows through feeder hole 40, to effusion cooling holes 42, thus filling a gap in the film cooling of first surface 36 that would form without effusion cooling holes 42. In addition, the flow of cooling air through feeder hole 40 serves to cool attachment stud 32, resulting in a lower thermal gradient in attachment stud 32 and areas of floatwall panel 22 surrounding attachment stud 32.

As shown in FIG. 3, and described below in reference to FIG. 5, effusion cooling holes 42 form a shallow, acute angle with first surface 36 of floatwall panel 22 to aid in forming the cooling film. Feeder hole 40 extends along attachment stud 32, which may extend from floatwall panel 22 at a right angle. While feeder hole 40 does not extend to first surface 36 of floatwall panel 22, feeder hole 40 extends along an axis through attachment stud 32 that, if extended to first surface 36 of floatwall panel 22, would form a greater angle with first surface 36 of floatwall panel 22 than that formed by effusion cooling holes 42. In some embodiments, the angle formed by the axis through attachment stud 32 and first surface 36 of floatwall panel 22 is a right angle. In other embodiments, the angle formed by the axis through attachment stud 32 and first surface 36 of floatwall panel 22 is not a right angle, but it is still greater than that formed by effusion cooling holes 42 at first surface 36 of floatwall panel 22. Thus, there is no line of sight through the length of cooling flow passageway 38. This structure provides the benefit of shallow angle effusion cooling hole 42 to fill a gap in film cooling, while being fed by feeder hole 40 running generally along the axis of perpendicularly extending attachment stud 32.

Figure 4A:
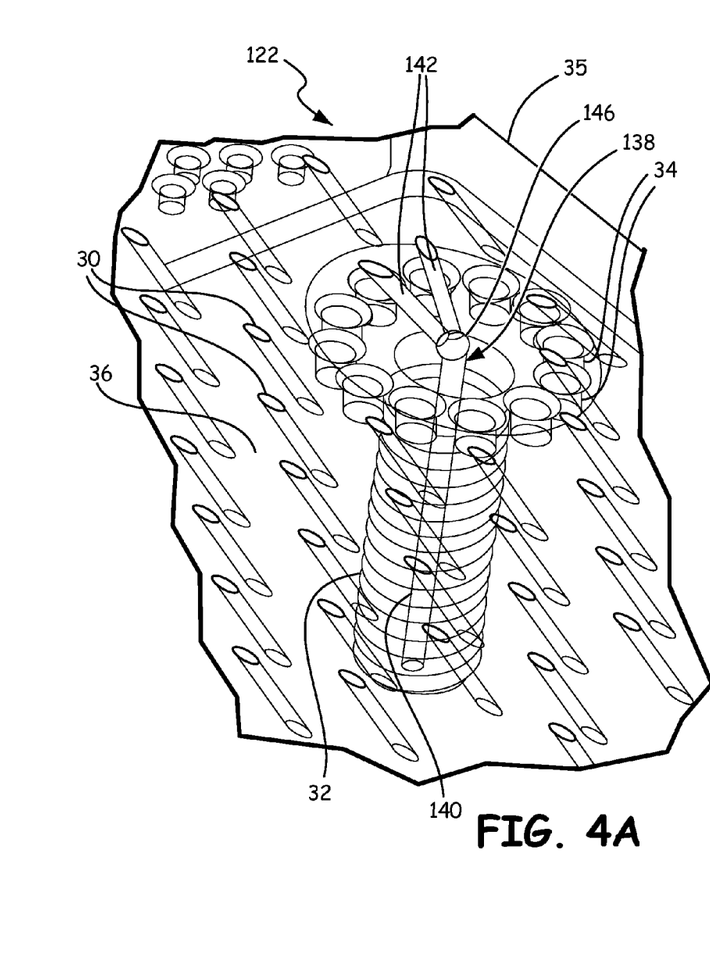
FIGS. 4A and 4B are perspective views of combustor floatwall panel embodiments with a first surface facing up.
Figure 4B:
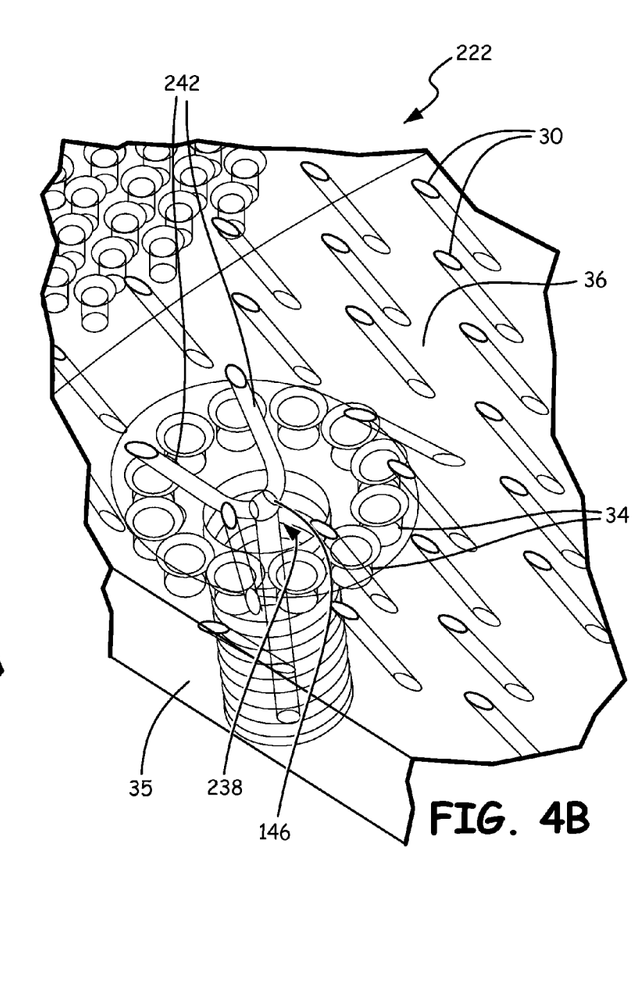

FIGS. 4A and 4B are perspective views of combustor floatwall panel embodiments with first surface 36 facing up. In these views, the only features normally visible are effusion cooling holes 30, 142, 242 where they meet first surface 36. These are shown with darker lines. All other features are intended to be shown in phantom, but are illustrated with lighter lines rather than broken lines for clarity. FIG. 4A shows floatwall panel 122 which is identical to floatwall panel 22 described above in reference to FIGS. 1, 2, and 3, except that cooling flow passageway 38 is replace by cooling flow passageway 138. As with cooling flow passageway 38, cooling flow passageway 138 extends through attachment stud 32 to first surface 36 of floatwall panel 122 to eliminate gaps in an effusion film. Cooling flow passageway 138 includes feeder hole 140, effusion cooling holes 142, and manifold 146. Effusion cooling holes 142 extend to first surface 36, where each of effusion cooling holes 142 forms a shallow, acute angle relative to first surface 36. Feeder hole 140 extends through attachment stud 32 to fluidly connect to effusion cooling holes 142. Feeder hole 140 does not extend to first surface 36.

In the embodiment of FIG. 4A, feeder hole 140 is fluidly connected to effusion cooling holes 142 by manifold 146. Manifold 146 may be located at the base of attachment stud 32 where there is panel structure sufficient to accommodate manifold 146 without significantly weakening attachment stud 32. Manifold 146 provides for a more uniform distribution of the flow of cooling air from feeder hole 140 between effusion cooling holes 142, than would generally be the case without manifold 146. Manifold 146 is illustrated as approximately spherical, but other shapes, including cylindrical and prismatic, may be employed as desired.

As illustrated in FIG. 4A, in some embodiments, effusion cooling holes 142 extend along an axis for their respective entire lengths. That is, effusion cooling holes 142 are straight. In other embodiments, such as that shown in FIG. 4B, the effusion cooling holes are not straight, but may be curved. FIG. 4B shows floatwall panel 222 which is identical to floatwall panel 122 described above in reference to FIG. 4B, except that cooling flow passageway 138 is replace by cooling flow passageway 238. As with cooling flow passageway 138, cooling flow passageway 238 extends through attachment stud 32 to first surface 36 of floatwall panel 222 to eliminate gaps in an effusion film. Cooling flow passageway 238 includes feeder hole 140, effusion cooling holes 242, and manifold 146. Effusion cooling holes 242 extend to first surface 36, where each of effusion cooling holes 242 forms a shallow, acute angle relative to first surface 36.

Unlike effusion cooling holes 142 of FIG. 4A, effusion cooling holes 242 do not extend along an axis for their respective entire lengths. Effusion cooling holes 242 extend along a curved path for at least a portion of their entire respective lengths. This curving of cooling holes 242 may permit a more even distribution of cooling holes 242 at first surface 36 of floatwall panel 222. Effusion cooling holes 242 do extend along an axis for at least a portion of their respective lengths, that portion ending where effusion cooling holes 242 each meet the inside surface of floatwall panel 222. Thus, as with the embodiments described above, each of effusion cooling holes 242 forms a shallow, acute angle relative to first surface 36.

Figure 5:
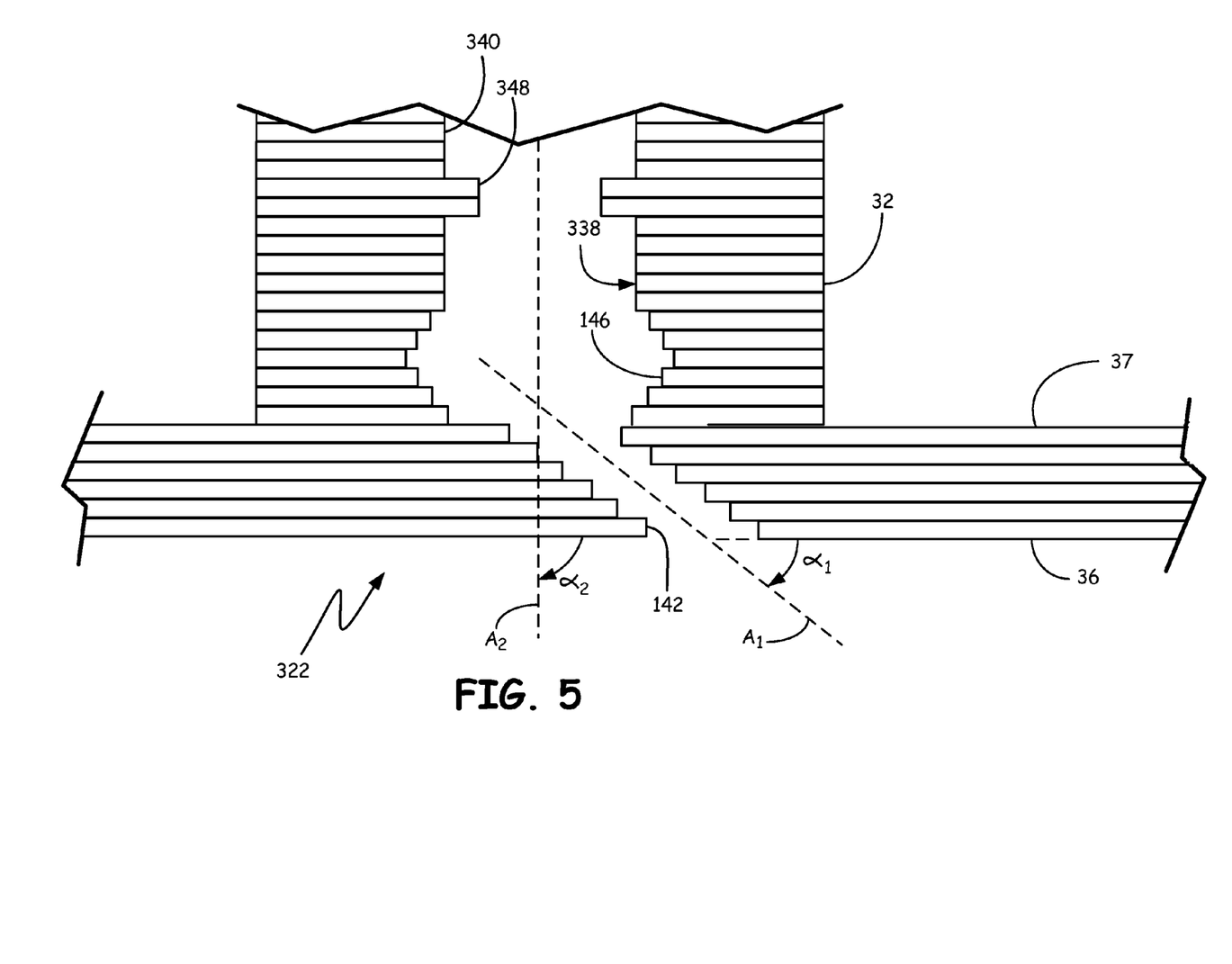
FIG. 5 is a cross-sectional view of an additively manufactured combustor floatwall panel, showing individual layers of sintered material and a cooling flow passageway.

FIG. 5 is a simplified cross-sectional view of a floatwall panel made using additive manufacturing methods. FIG. 5 includes floatwall panel 322, which is made up of a series of laminated layers of sintered material. Floatwall panel 322 is identical to floatwall panel 122 described above, except that feeder hole 340 of cooling flow passageway 338 includes optional flow metering orifice 348. Flow metering orifice 348 is a restriction provided in feeder hole 340 to meter the flow of cooling air to effusion cooling holes 140, by way of manifold 146. Feeder hole 340 is fluidly connected to effusion cooling holes 142 by manifold 146. Feeder hole 340 does not extend to first surface 36.

As shown in FIG. 5, effusion cooling hole 142 extends along first axis A1 where effusion cooling hole 142 meets first surface 36. First axis A1 forms first angle $\alpha_1$ relative to first surface 36. First angle $\alpha_1$ is a shallow, acute angle to aid in forming the cooling film along first surface 36. While feeder hole 340 does not extend to first surface 36, feeder hole 340 extends along second axis A2 through attachment stud 32 that, if extended to first surface 36, form second angle $\alpha_2$ relative to first surface 36. Second angle $\alpha_2$ is greater than first angle $\alpha_1$.

In some embodiments, second angle $\alpha_2$ is a right angle. In other embodiments, second angle $\alpha_2$ is not a right angle, but it is still greater than that first angle $\alpha_1$. Thus, there is no line of sight through the length of cooling flow passageway 338. This structure provides the benefit of shallow angle effusion cooling hole 142 to fill a gap in film cooling, while being fed by feeder hole 340 running generally along the axis of perpendicularly-extending attachment stud 32.

The entire structure shown in FIG. 5 is made using additive manufacturing. Layers of sinterable material are applied to a substrate and selectively sintered. As additional layers are built, apertures are excluded from sintering that form a layerwise successively built hole. When sintering is complete, unsintered material, such as material that fills cooling flow passageway 338 may be removed while sintered material remains. This may be accomplished by blowing or brushing away excess material, often with an inert gas. Thus, by leaving unsintered apertures in each layer of material, the entirety of cooling flow passageway 338 may be formed. For some designs, additive manufacturing will leave a rough surface. This rough surface may be removed by, for example, machining or sanding the exterior of the finished part.

Laser ablation manufacturing requires line of sight for any passageway formed. Cooling flow passageways of the present disclosure do not have line of sight through their length. Thus, cooling flow passageways of the present disclosure cannot be made using traditional laser ablation.

Figure 6:
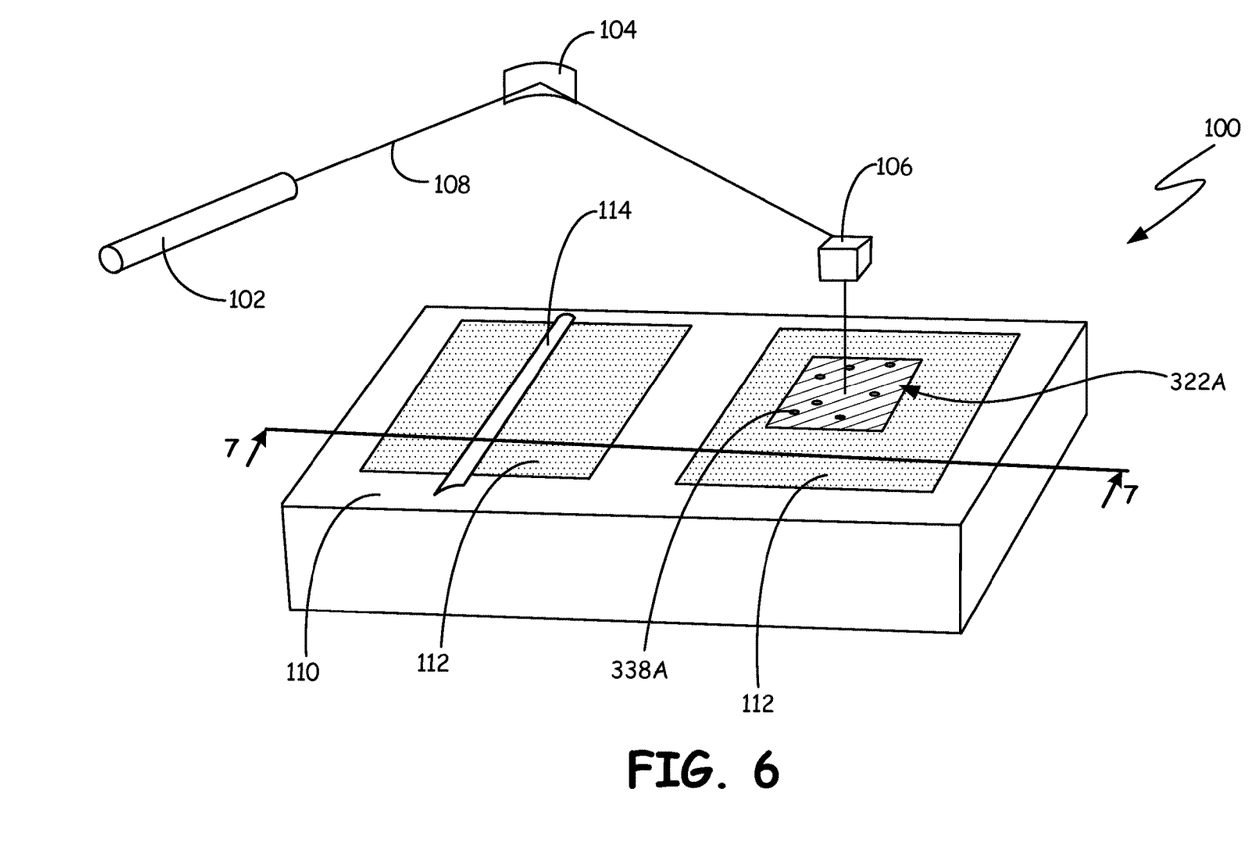
FIG. 6 is a perspective view of an additive manufacturing apparatus.

FIG. 6 shows additive manufacturing apparatus 100. In particular, FIG. 6 shows an additive manufacturing apparatus which uses laser additive manufacturing to create a three-dimensional object out of sinterable, pulverant material. While direct metal laser sintering (DMLS) is described, other additive manufacturing techniques may be employed.

Additive manufacturing apparatus 100 includes a set of optical components, including laser 102, minor 104, and moving optical head 106, which guide laser beam 108. Laser 102 may be any source of heating radiation, such as a CO2 laser. Additive manufacturing apparatus 100 also includes frame 110, pulverant material 112, and coater 114, which are used for powder containment and application. Pulverant material 112 may be any material suitable for use as a floatwall panel. Typically, pulverant material 112 will be some combination of ceramic and/or metal. For example, pulverant material 112 may be a high temperature superalloy. As shown in FIG. 6, partially built floatwall panel 322A contains hole segments 338A.

Laser 102 creates a laser beam which can be used for melting, sintering, or cutting. Laser 102 is pointed towards minor 104, which is arranged to deflect incident radiation toward moving optical head 106. In operation, laser 102 emits laser beam 108, which is deflected by minor 104 and moving optical head 106 to selectively melt, sinter, or cut. Generally, laser beam 108 will be targeted within frame 110, which holds pulverant material 112. Coater 114 is arranged along a surface of frame 110, and may be moved across the surface of frame 110. Coater 114 may be, for example, a knife blade or a roller. As shown in FIG. 5, partially built floatwall panel 322A, including cooling hole segments 338A, is present inside frame 110.

In operation, laser beam 108 is generated by laser 102. Laser beam 108 is deflected by minor 104 towards moving optical head 106. Moving optical head 106 directs laser beam 108 towards areas within frame 110 that include pulverant material 112 which are melted or sintered. Generally, the areas melted or sintered form a layer of a floatwall. In FIG. 6, partially built floatwall panel 322A is shown. Voids may be created within partially built floatwall panel 322A to form cooling hole segments 338A.

After each layer of partially built floatwall panel 322A is finished, the support holding partially built floatwall panel 322A (not shown) is lowered by the thickness of one layer of pulverant material 112, additional pulverant material 112 is added on top of the existing structures using coater 114, and the process is repeated. By repeating the process several times, a layer-by-layer object, such as a complete floatwall panel 322 including cooling flow passageway 338, may be manufactured.

Traditional subtractive manufacturing utilizes laser ablation to remove the material where cooling holes are desired. This manufacturing method is problematic because of the line of sight requirement of laser ablation. Using the additive manufacturing method described above, various geometries may be created for cooling flow passageways. Cooling flow passageway may be created that do not have line of sight through their length.

Figure 7:
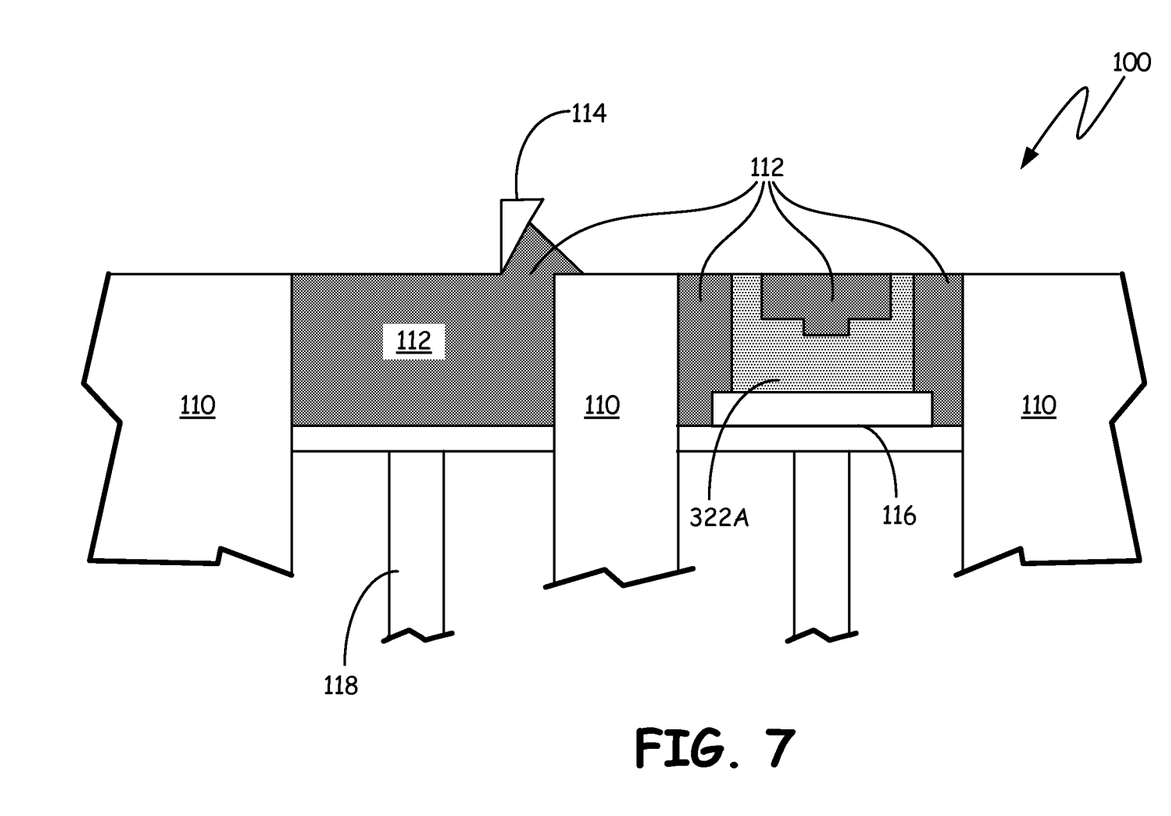
FIG. 7 is a cross-sectional view of the additive manufacturing apparatus of FIG. 6, taken along line 7-7.

FIG. 7 shows additive manufacturing apparatus 100 of FIG. 6, taken along line 7-7. FIG. 7 is a cutaway view that shows the operation of additive manufacturing apparatus 100. FIG. 7 shows a DMLS apparatus, but it will be understood by those skilled in the art that other additive manufacturing techniques and apparatuses may be used.

Additive manufacturing apparatus 100 as shown in FIG. 7 includes many of the same parts as those shown in FIG. 6, such as frame 110, pulverant material 112, coater 114, and partially built floatwall panel 322A. FIG. 7 also shows component support 116 and material supply support 118. Component support 116 may be used to raise or lower partially built floatwall panel 322A. Material supply support 118 may be raised to elevate or lower pulverant material 112 above the working surface of frame 110.

FIG. 7 shows the arrangement of component support 116 and material supply support 118 in addition to the arrangement of parts shown in FIG. 6. As can be seen in FIG. 7, partially built floatwall panel 322A rests on component support 116. Likewise, pulverant material 112 rests on material supply support 118.

As each layer of partially built floatwall panel 322A is melted or sintered, component support 116 is lowered and material supply support 118 is raised. Coater 114 scrapes a layer of pulverant material 112 off of the top of the supply side and applies it in a layer across the top of partially built floatwall panel 322A. The process is then repeated until floatwall panel 322 is complete.

FIG. 7 shows one possible way of additively manufacturing a floatwall panel with a cooling flow passageway as disclosed above in reference to FIGS. 2, 3, 4A, 4B, and 5. Alternative methods for additively manufacturing components are possible. For example, selective laser sintering, electron beam melting, laser powder deposition, or electron beam wire manufacturing may be used to create objects in an additive fashion.

While the invention has been described with reference to an exemplary embodiment(s), it will be understood by those skilled in the art that various changes may be made and equivalents may be substituted for elements thereof without departing from the scope of the invention.

For example, while embodiments disclosed illustrate cooling flow passageways including two effusion cooling holes, it is understood that the present disclosure encompasses embodiments having cooling flow passageways including a single effusion cooling hole and embodiments having cooling flow passageways including more than two effusion cooling holes.

In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A combustor floatwall panel includes a stack of layers of a sintered material, which form in the aggregate a panel having a first surface and a second surface parallel to the first surface, an attachment stud projecting from the second surface, and a cooling flow passageway that is made up of a series of apertures in adjacent layers. The cooling flow passageway includes a feeder hole extending through the attachment stud, and at least one effusion cooling hole extending to the first surface and fluidly connected to the feeder hole. The one or each effusion cooling hole extends along a first axis where the effusion cooling hole meets the first surface, the first axis at a first angle relative to the first surface. The feeder hole extends along a second axis through the attachment stud at a second angle relative to the first surface. The second angle is greater than the first angle.

The combustor floatwall panel of the preceding paragraph can optionally include, additionally and/or alternatively, any one or more of the following features, configurations and/or additional components:

the cooling flow passageway further includes a manifold fluidly connecting the feeder hole to the one or each effusion cooling hole;

an end of the feeder hole farthest from the one or each effusion cooling holes includes a chamfered edge;

the feeder hole includes a flow metering orifice;

the combustor floatwall panel is made out of a sintered metal; and the sintered metal is a high-temperature superalloy.

A method for making a combustor floatwall panel includes forming, by selectively sintering a pulverant material, a multilayer structure including a wall, an attachment stud projecting from the wall, and a series of interconnected apertures filled with unsintered pulverant material. Next, removing the unsintered pulverant material from the interconnected apertures to create a cooling flow passageway. The cooling flow passageway includes a feeder hole extending through the attachment stud, and at least one effusion cooling hole extending to the first surface and fluidly connected to the feeder hole. The one or each effusion cooling hole extends along a first axis where the effusion cooling hole meets the first surface, the first axis at a first angle relative to the first surface. The feeder hole extends along a second axis through the attachment stud at a second angle relative to the first surface. The second angle is greater than the first angle.

The method of the preceding paragraph can optionally include, additionally and/or alternatively, any one or more of the following features, configurations and/or additional components:

removing the unsintered pulverant material is accomplished using gas to blow away excess filler material;

selectively sintering the pulverant material comprises using laser additive manufacturing;

selectively sintering the pulverant material comprises using direct metal laser sintering;

selectively sintering the pulverant material comprises using an electron beam;

the cooling flow passageway further includes a manifold fluidly connecting the feeder hole to the one or each effusion cooling hole;

the pulverant material is a sinterable metal; and the pulverant material is a high-temperature superalloy.

A gas turbine engine includes a compressor section, a turbine section, and a combustor section arranged between the compressor section and the turbine section. The combustor section includes a high pressure plenum in fluid communication with the compressor section, a combustion chamber in fluid communication with the turbine section, and at least one combustor floatwall panel arranged between the high pressure plenum and the combustion chamber. The combustor floatwall panel includes a cooling flow passageway. The cooling flow passageway includes a feeder hole extending through an attachment stud, and at least one effusion cooling hole extending to a first surface facing the combustion chamber and fluidly connected to the feeder hole. The one or each effusion cooling hole extends along a first axis where the effusion cooling hole meets the first surface, the first axis at a first angle relative to the first surface. The feeder hole extends along a second axis through the attachment stud at a second angle relative to the first surface. The second angle is greater than the first angle.

The gas turbine engine of the preceding paragraph can optionally include, additionally and/or alternatively, any one or more of the following features, configurations and/or additional components:

the cooling flow passageway further includes a manifold fluidly connecting the feeder hole to the one or each effusion cooling hole;

an end of the feeder hole farthest from the one or each effusion cooling holes includes a chamfered edge;

the feeder hole includes a flow metering orifice;

the combustor floatwall panel is made of layers of sintered material; and the sintered material is a high-temperature superalloy.

The invention claimed is:

1. A combustor floatwall panel comprising:
a stack of layers of a sintered material, which form in aggregate:
a panel having a first surface and a second surface parallel to the first surface;
an attachment stud projecting from the second surface; and
a cooling flow passageway that is made up of a series of apertures in adjacent layers, the cooling flow passageway includes:
a feeder hole extending through the attachment stud;
a plurality of effusion cooling holes extending to the first surface and fluidly connected to the feeder hole;
wherein the plurality of effusion cooling holes extend along non-parallel first axes to meet the first surface at a first angle relative to the first surface; the feeder hole extends along a second axis through the attachment stud at a second angle relative to the first surface; and the second angle is greater than the first angle; and
a manifold fluidly connecting the feeder hole to each of the plurality of effusion cooling holes, wherein the manifold has a first cross-sectional area and the feeder hole has a second cross-sectional area, and wherein the first cross-sectional area and the second cross-sectional area are measured normal to the second axis and wherein the first cross-sectional area is greater than the second cross-sectional area.

2. The combustor floatwall panel of claim 1, wherein an end of the feeder hole farthest from each of the plurality of effusion cooling holes includes a chamfered edge.

3. The combustor floatwall panel of claim 1, wherein the feeder hole includes a flow metering orifice positioned between an end of the feeder hole and the plurality of effusion cooling holes.

4. The combustor floatwall panel of claim 1, wherein the combustor floatwall panel is made out of a sintered metal.

5. The combustor floatwall panel of claim 4, wherein the sintered metal is a high-temperature superalloy.

6. The combustor floatwall panel of claim 1, wherein the manifold is spherical in shape.

7. The combustor floatwall panel of claim 1, wherein each of the plurality of effusion cooling holes extends along a curved path for at least a portion of a respective entire length.

8. A method for making a combustor floatwall panel, the method comprising:
forming, by selectively sintering a pulverant material, a stack of layers of a sintered material, which form in aggregate a panel having a first surface and a second surface parallel to the first surface and an attachment stud projecting from the second surface, and a series of interconnected apertures in adjacent layers filled with unsintered pulverant material; and
removing the unsintered pulverant material from the series of interconnected apertures to create a cooling flow passageway; the cooling flow passageway including a feeder hole extending through the attachment stud, and a plurality of effusion cooling holes extending to the first surface and fluidly connected to the feeder hole; wherein the plurality of effusion cooling holes extend along non-parallel first axes to meet the first surface at a first angle relative to the first surface; the feeder hole extends along a second axis through the attachment stud at a second angle relative to the first surface; and the second angle is greater than the first angle, and wherein the cooling flow passageway further includes a manifold fluidly connecting the feeder hole to each of the plurality of effusion cooling holes, wherein the manifold has a first diameter and the feeder hole has a second diameter, and wherein the first diameter and the second diameter are measured normal to the second axis and wherein the first diameter is greater than the second diameter.

9. The method of claim 8, wherein removing the unsintered pulverant material is accomplished using gas to blow away excess filler material.

10. The method of claim 8, wherein selectively sintering the pulverant material comprises using laser additive manufacturing.

11. The method of claim 8, wherein selectively sintering the pulverant material comprises using direct metal laser sintering.

12. The method of claim 8, wherein selectively sintering the pulverant material comprises using an electron beam.

13. The method of claim 8, wherein the pulverant material is a sinterable metal.

14. The method of claim 13, wherein the pulverant material is a high-temperature superalloy.

15. A gas turbine engine comprising:
a compressor section;
a turbine section; and
a combustor section arranged between the compressor section and the turbine section, the combustor section including
a high pressure plenum in fluid communication with the compressor section;
a combustion chamber in fluid communication with the turbine section; and
at least one combustor floatwall panel arranged between the high pressure plenum and the combustion chamber and formed from layers of sintered material, wherein the combustor floatwall panel includes a cooling flow passageway; the cooling flow passageway including: a feeder hole extending through an attachment stud;
a plurality of effusion cooling holes extending to a first surface facing the combustion chamber and fluidly connected to the feeder hole;
wherein the plurality of effusion cooling holes extend along non-parallel first axes to meet the first surface at a first angle relative to the first surface; the feeder hole extends along a second axis through the attachment stud at a second angle relative to the first surface; and
the second angle is greater than the first angle; and
a manifold fluidly connecting the feeder hole to each of the plurality of effusion cooling holes, wherein the manifold has a first cross-sectional area and the feeder hole has a second cross-sectional area, and wherein the first cross-sectional area and the second cross-sectional area are measured normal to the axis and wherein the first cross-sectional area is greater than the second cross-sectional area.

16. The gas turbine engine of claim 15, wherein an end of the feeder hole farthest from each of the plurality of effusion cooling holes includes a chamfered edge.

17. The gas turbine engine of claim 15, wherein the feeder hole includes a flow metering orifice positioned between an end of the feeder hole and the plurality of effusion cooling holes.

18. The gas turbine engine of claim 15, wherein the sintered material is a high-temperature superalloy.

19. The gas turbine engine of claim 15, wherein each of the plurality of effusion cooling holes extends along a curved path for at least a portion of a respective entire length.

* * * * *

UNITED STATES PATENT AND TRADEMARK OFFICE
CERTIFICATE OF CORRECTION

PATENT NO. : 10,190,773 B2
APPLICATION NO. : 15/029000
DATED : January 29, 2019
INVENTOR(S) : Russell B. Hanson and George B. Titterton, III Page 1 of 1

It is certified that error appears in the above-identified patent and that said Letters Patent is hereby corrected as shown below:

In the Specification

Column 6, Line 20:
Delete "minor"
Insert --mirror--

Column 6, Line 35:
Delete "minor"
Insert --mirror--

Column 6, Line 37:
Delete "minor"
Insert --mirror--

Column 6, Line 47:
Delete "minor"
Insert --mirror--

Signed and Sealed this
Second Day of April, 2019

Andrei Iancu
*Director of the United States Patent and Trademark Office*